United States Patent
Colaitis et al.

(10) Patent No.: US 8,462,982 B2
(45) Date of Patent: Jun. 11, 2013

(54) METHOD FOR INSERTING WATERMARK ASSISTANCE DATA IN A BITSTREAM AND BITSTREAM COMPRISING THE WATERMARK ASSISTANCE DATA

(75) Inventors: Marie-Jean Colaitis, Cesson Sevigne (FR); Pascal Marie, Pace (FR)

(73) Assignee: Thomson Licensing, Issy les Moulineaux (FR)

( * ) Notice: Subject to any disclaimer, the term of this patent is extended or adjusted under 35 U.S.C. 154(b) by 279 days.

(21) Appl. No.: 12/783,960

(22) Filed: May 20, 2010

(65) Prior Publication Data
US 2011/0129114 A1 Jun. 2, 2011

(30) Foreign Application Priority Data
May 29, 2009 (EP) .................................... 09305493

(51) Int. Cl.
*G06K 9/00* (2006.01)
(52) U.S. Cl.
USPC ........................................................ 382/100
(58) Field of Classification Search
None
See application file for complete search history.

(56) References Cited

U.S. PATENT DOCUMENTS

| | | | | |
|---|---|---|---|---|
| 5,710,834 A * | 1/1998 | Rhoads | ........................ | 382/232 |
| 6,411,725 B1 * | 6/2002 | Rhoads | ........................ | 382/100 |
| 6,415,042 B1 * | 7/2002 | Shin | ........................ | 382/100 |
| 6,885,756 B2 * | 4/2005 | Kitamura | ........................ | 382/100 |
| 7,181,044 B2 * | 2/2007 | Watson et al. | ................. | 382/100 |
| 7,433,488 B2 * | 10/2008 | Kitani et al. | ................... | 382/100 |
| 2002/0085737 A1 * | 7/2002 | Kitamura | ........................ | 382/100 |
| 2004/0152479 A1 * | 8/2004 | Rainbolt et al. | ............... | 455/506 |
| 2006/0056653 A1 * | 3/2006 | Kunisa | ............................ | 382/100 |
| 2006/0268989 A1 | 11/2006 | Kadona et al. | | |
| 2007/0030996 A1 * | 2/2007 | Winger et al. | ................. | 382/100 |
| 2007/0154060 A1 * | 7/2007 | Sun | ................................ | 382/100 |
| 2007/0220266 A1 * | 9/2007 | Cooper et al. | ................. | 713/176 |
| 2008/0101456 A1 * | 5/2008 | Ridge et al. | .............. | 375/240.01 |
| 2008/0320375 A1 * | 12/2008 | Hori et al. | ...................... | 714/807 |
| 2009/0067667 A1 * | 3/2009 | Jabri | ............................ | 382/100 |
| 2009/0080689 A1 * | 3/2009 | Zhao et al. | ...................... | 382/100 |
| 2009/0136087 A1 * | 5/2009 | Oren et al. | ...................... | 382/100 |

FOREIGN PATENT DOCUMENTS

| | | |
|---|---|---|
| EP | 1983755 A1 | 10/2008 |
| WO | 2007067168 A1 | 6/2007 |
| WO | 2008118145 A1 | 10/2008 |

OTHER PUBLICATIONS

Zou, Dekun, et al. "H.264/AVC Stream Replacement Technique for Video Watermarking," Acoustics, Speech and Signal Processing, 2008. ICASSP 2008. IEEE Int'l Conference, IEEE, Piscataway NJ, pp. 1749-1752.
European Search Report for EP09 30 5493 dated Jan. 27, 2010.

\* cited by examiner

*Primary Examiner* — Wenpeng Chen
*Assistant Examiner* — Feng Niu
(74) *Attorney, Agent, or Firm* — Tutunjian & Bitetto, P.C.

(57) ABSTRACT

The invention relates to a method for inserting watermark assistance data in a bitstream of coded data comprising the step of inserting, in the bitstream, identification data identifying coded data to be substituted and, for each coded data to be substituted, at least one substitution data. The method further comprises a step of inserting in the bitstream a format data defining a manner of substituting the coded data to be substituted by the substitution data.

7 Claims, 3 Drawing Sheets

METHOD FOR INSERTING WATERMARK ASSISTANCE DATA IN A BITSTREAM AND BITSTREAM COMPRISING THE WATERMARK ASSISTANCE DATA

This application claims the benefit, under 35 U.S.C. §119 of THE European Procedure Patent Application 09/305493, filed May 29, 2009.

1. FIELD OF THE INVENTION

The invention relates to the technical domain of coding. More precisely the invention relates to a method for inserting watermark assistance data in a bitstream of coded data, to a method of watermarking the bitstream of coded data using the inserted watermark assistance data and to a device implementing the method of watermarking. It further relates to a bitstream of coded data comprising the watermark assistance data inserted by the method of insertion.

2. BACKGROUND OF THE INVENTION

In order to protect a digital content (for example a video, audio or 3D data, etc.), it is known to insert a unique watermark arising in the form of a digital code into each of the streams distributed so as to identify the person or the body having authorized the transmission of the content without authorization. As an example, during the promotion of a film, DVDs watermarked with the aid of a different watermark are delivered to selected persons. In the case of a leak, it is possible by reconstructing the watermark to identify the source of the leak. Other applications are possible: insert a watermark making it possible to identify the work or the beneficiaries, or else to transmit auxiliary data (metadata) via the watermark.

To this aim, video watermarking is known to be used by a consumer device to personalize a bitstream of coded data representative of a video/a sequence of images. The "personalization" is achieved by inserting a digital code representing as an example a "user ID" and possibly a timestamp in the bitstream of coded data or even some other kinds of information (like copyright). Subsequently in the document, the terms "watermark", "digital code" and "User ID" are used interchangeably to designate the digital code inserted into the bitstream of coded data. In order to lower the computing power required in the consumer device to perform such personalization, it is known to use a "watermark by substitution" technique with the "assistance" of watermark assistance data such as Watermark Substitution Maps (referred as WSM). This assisted substitution technique implements the watermarking process into 3 steps.

The first step is occurring in the broadcaster head-end where the watermark assistance data are generated using the sequence of images or more generally the digital content to be broadcasted. Then, during the second step those watermark assistance data are embedded in the bitstream of coded data and transmitted to the consumer side where the third step occurs. During the third step, the watermark assistance data are used in the consumer device to assist the personalization of the received bitstream of coded data by inserting watermarks. The aim of the first step is to ensure that the substitution will not corrupt the bitstream of coded data, to ensure that the watermark, i.e. the personalization, will not be visible/audible by the consumer after reconstructing the sequence of images and to ensure that the watermark will be robust enough to some relevant attacks. Therefore, the first step comprises the identification, in the bitstream of coded data, of data to be substituted and the determination of substitution data. It further guarantees both robustness and fidelity. The watermark assistance data are resulting from this first step.

During the second step, watermark assistance data are then embedded in the bitstream of coded data to be transmitted to the consumer device. It is known in the prior art to embed the watermark assistance data using MPEG2-TS private or user data (TS stands for "Transport Stream"). The MPEG2-TS transport layer is defined in the document ITU T Rec. H.222.0 | ISO/IEC13818 1 (2rd edition, 2000) entitled "Information Technology—Generic Coding of moving images and associated audio: Systems".

During the third step, the personalization watermarking is applied by the consumer device in the compressed domain. Indeed, the watermarks are "inserted" directly in the bitstream of coded data. This insertion is made by replacing (substituting) in the bitstream of coded data some coded data by some other ones, called substitution data, based on the information contained in the embedded watermark assistance data. Inserting watermarks in the compressed domain makes it possible to both protect the bitstream itself but also the baseband content resulting from decoding the bitstream of coded data. Indeed, the watermarks propagate to the baseband content during decompression.

A first drawback of this solution is that MPEG2-TS private or user data are easily removable which renders the solution less robust to an attack. Secondly MPEG2-TS private and user data are not encrypted, thus requiring specific additional encryption mechanism. Furthermore, the size of the portion of an MPEG2-TS packet allocated for private data is limited in size which limits the size of the watermark assistance data. In addition, with user data synchronization of the watermark assistance data with the sequence of images is not straightforward. Indeed, user data are encapsulated into MPEG2-TS packets that are different from those encapsulating the video, therefore requesting synchronization of the various packets. Finally, WSM as defined in the prior art do not provide flexibility with respect to various applications requirements.

3. BRIEF SUMMARY OF THE INVENTION

The invention is aimed at alleviating at least one of the drawbacks of the prior art. To this aim, the invention relates to a method for inserting watermark assistance data in a bitstream of coded data. The method comprises the step of inserting, in the bitstream of coded data, identification data identifying coded data to be substituted and, for each coded data to be substituted, at least one substitution data. The method further comprises a step of inserting, in the bitstream of coded data, a format data defining a manner of substituting the coded data to be substituted by the substitution data. The format data provides flexibility to make it possible to best match to various applications requirements.

According to a specific embodiment, the method further comprises a step of inserting in the bitstream of coded data, for each coded data to be substituted, a check data.

According to a specific characteristic, the check data is a cyclic redundancy check computed from the coded data to be substituted.

According to a variant, the check data is the coded data to be substituted.

According to a specific characteristic, the identification data is an absolute address identifying the beginning of the coded data to be substituted.

According to a variant used when the bitstream of coded data is encapsulated in transport packets, the identification data comprises a data identifying the transport packet comprising the coded data to be substituted and an offset value relative to the beginning of the transport packet identifying the beginning of the coded data to be substituted.

According to a specific characteristic, the identification data, the substitution coded data and the format data are inserted in the bitstream of coded data in the form of a supplemental enhancement information message.

The invention further relates to a bitstream of coded data comprising:
   identification data identifying coded data to be substituted; and
   at least one substitution data for each coded data to be substituted; and
   a format data defining a manner of substituting the coded data to be substituted by the substitution data.

In addition, the invention proposes a method of watermarking a bitstream of coded data by a watermark comprising the following steps:
   determining, from the bitstream of coded data, identification data identifying coded data to be substituted, at least one substitution data for each coded data to be substituted and a format data defining a manner of substituting coded data to be substituted by the substitution data;
   identifying, with the identification data, coded data to be substituted; and
   watermarking the bitstream of coded data by substituting each coded data to be substituted by one substitution coded data on the basis of the format data and of the watermarking data.

The invention is further concerned with a device comprising:
   an input for receiving a bitstream of coded data representative of a digital content;
   a watermarking module for watermarking the bitstream of coded data on the basis of an identifier associated to the device into a watermarked bitstream;
   a decoding module for reconstructing a watermarked digital content from the watermarked bitstream;
   a first output for transmitting the watermarked bitstream; and
   a second output for transmitting the watermarked digital content.

The watermarking module of the device comprises:
   a unit for determining, from the bitstream of coded data, identification data identifying coded data to be substituted, at least one substitution data for each coded data to be substituted and a format data defining a manner of substituting coded data to be substituted by the substitution data;
   a unit for identifying with the identification data coded data to be substituted; and
   a watermarking unit for watermarking the bitstream of coded data by substituting the coded data to be substituted by one substitution coded data on the basis of the format data and of the watermarking data.

4. BRIEF DESCRIPTION OF THE DRAWINGS

Other features and advantages of the invention will appear with the following description of some of its embodiments, this description being made in connection with the drawings in which.

5. DETAILED DESCRIPTION OF PREFERRED EMBODIMENTS

Figure 1:
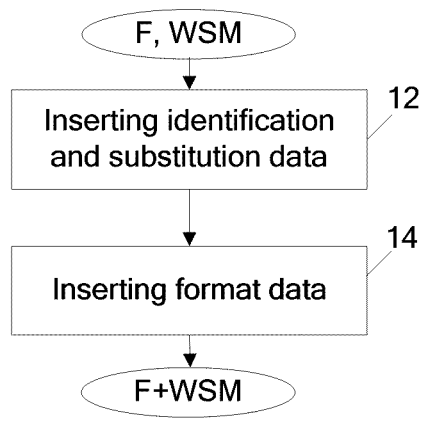
FIG. 1 is a block diagram of a method of insertion according to the invention.

The invention relates to a method of insertion of watermark assistance data (such as WSM) in a bitstream of coded data. For the sake of simplicity, the bitstream of coded data is considered, in the following, to be representative of a sequence of images. However, the bitstream of coded data may represent of any kind of digital content such as audio or 3D data. Generally, the coding of a sequence images as a bitstream of coded data comprises the prediction of image data either from image data of previously coded images (temporal prediction) or from image data of the same image previously coded (spatial prediction). The residual data which are computed by subtracting the prediction data from the original data are generally transformed (for example using a Discrete Cosine Transform or an approximation of it) and quantized. The quantized data are finally entropy coded into a bitstream of coded data using for example VLC (English acronym of "Variable Length Code") tables. As an example, the sequence can be encoded to be in conformance with the MPEG-4 AVC/H.264 standard described in the document ISO/IEC 14496-10 Second Edition entitled <<Information technology—Coding of audio-visual objects—Part 10: Advanced Video Coding>> and published on Dec. 15, 2005. According to a variant, the sequence of images is coded according to the H.263 standard described in the recommendation from ITU-T entitled "SERIES H: AUDIOVISUAL AND MULTIMEDIA SYSTEMS—Infrastructure of audio-visual services—Coding of moving Video—Video coding for low bit rate communication". According to another variant, the sequence of images is coded according to the MPEG-2 standard described in the document ISO/IEC 13818-2 entitled <<Information technology—Generic coding of moving picture and associated audio information: Video>> and published on the 15 Dec. 2000. The invention is neither limited by a standard nor by a type of digital content.

According to the invention, watermark assistance data may have several entries. Each entry comprises:
   at least one identification data for identifying in the bitstream of coded data a coded data to be substituted; and
   at least one substitution data.

As an example, the identification data is defined as an offset value from the beginning of the bitstream of coded data to the beginning (e.g. first bit or byte) of the coded data to be substituted.

According to a variant, the identification data is defined as an offset value from the beginning of an image to the beginning of the coded data to be substituted.

According to a variant, if the watermark assistance data are encapsulated into transport packets such as MPEG-2 TS packets, the offset value comprises two parts:
   a reference to the packet that comprises the first data (e.g. the first bit or byte) of the coded data to be substituted and
   an offset value from the beginning of this packet to the first data of the coded data to be substituted.

As an example, up to "m" coded data to be substituted are identified every "n" images in the bitstream of coded data, with "m" and "n" being integers such as 16 and 1. According to a variant, such coded data to be substituted are identified according to the method disclosed in the international patent application WO 2008/118145 published on Oct. 2, 2008.

As an example, the substitution data is determined according to the method described in the document WO 2008/118145 published on Oct. 2, 2008.

A first exemplary embodiment of a method of insertion of watermark assistance data into a bitstream F of coded data is described with reference to FIG. 1. The bitstream of coded data is considered in the following to be representative of a sequence of images but may be representative of any kind of digital content such as audio or 3D data.

At a step 12, at least one identification data identifying a coded data to be substituted and at least one substitution data are inserted in the bitstream of coded data. The identification data and the substitution data can be computed from the bitstream of coded data or provided by a Look-Up Table.

At step 14, a format data which defines a manner of substituting the coded data to be substituted by the substitution data is inserted in the bitstream of coded data F.

The format data can be provided as a parameter by external means such as a user interface. Such a format data can be fixed depending on the application or can be changed dynamically. Selecting a format data is tradeoff between several aspects:
- the compression scheme that has been used to produce the bitstream of coded data F and its ability to enable substitutions,
- the bitstream of coded data syntax of the compression scheme,
- the number of substitution the application needs to make per image,
- the bit-rate that could be allocated to the watermark assistance data extra payload that could be minimized by some specific formats,
- the need to avoid decompression errors,
- the robustness to attacks that is targeted for the watermark,
- the actual size of the digital code to be embedded and
- its repetition rate over time, etc.

The format data provides flexibility to make it possible to best match to various applications requirements. Thus many variants can be derived.

As an example, the format data defines the number of substitution data, defines if the substitution is made subject to error check. Depending on the format data encoded in the bitstream of coded data some additional data may be encoded such as check data.

Figure 2:
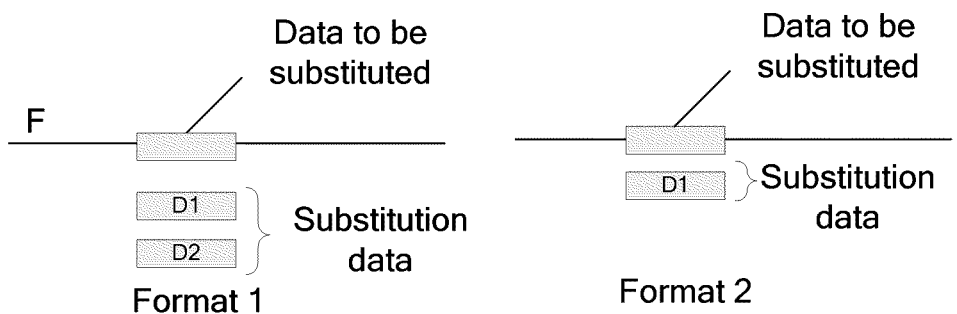
FIGS. 2, 3 and 4 represent a bitstream of coded data and various substitution data defined according to the invention.

As an example, according to a first format of substitution (Format 1), two substitution data are inserted at step 12. One of the substitution data D1 is used, in the consumer device, to replace the coded data to be substituted in order to embed a '0' in the bitstream of coded data and the second of the substitution data D2 is used to replace the coded data to be substituted in order to embed a '1' in the bitstream of coded data. This case is illustrated on the left part of FIG. 2.

According to a second format of substitution (Format 2), a single substitution data is inserted at step 12. The single substitution data D1 is used, in the consumer device, to replace the coded data to be substituted in order to embed a '0' in the bitstream of coded data while the coded data to be substituted is replaced by itself (i.e. no substitution is achieved) in order to embed a '1' in the bitstream of coded data. According to a variant, the single substitution data is used to replace the coded data to be substituted in order to embed a '1' in the bitstream of coded data while the coded data to be substituted is replaced by itself (i.e. no substitution is achieved) in order to embed a '0' in the bitstream of coded data. This case is illustrated on the right part of FIG. 2.

Figure 3:
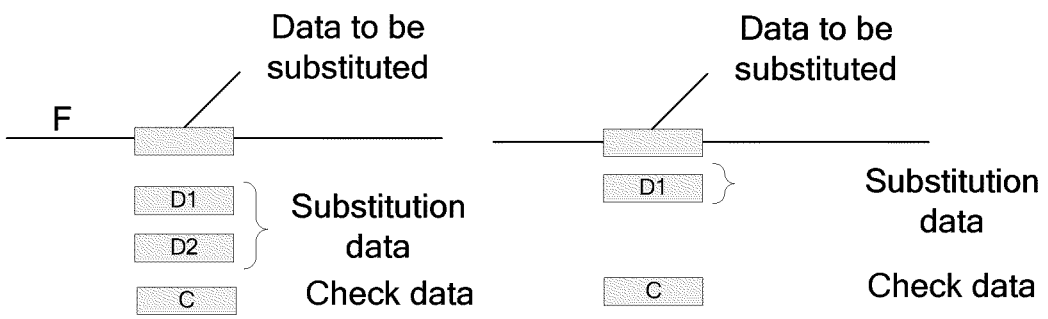

According to a variant of the first and second format of substitution, a check data is inserted at step 12. This case is illustrated on FIG. 3. The check data is for example the coded data to be substituted or a CRC (stands for "Cyclic redundancy Check") computed from the coded data to be substituted. As an example, the check data is an XOR (logical operation known as exclusive or) of all the bytes of the coded data to be substituted. If the check data is the coded data to be substituted then the check data is compared, in the consumer device, to the received coded data to be substituted. If both data match then the substitution takes place otherwise no substitution is made and an error is possibly reported. If the check data is a CRC then the check data is compared to a CRC computed locally based on the received coded data to be substituted. If both data are equal then the substitution takes place otherwise no substitution is made. Indeed, no substitution is made if in the bitstream of coded data received by the consumer device the coded data to be substituted has undergone some modification during transmission. Such modifications may be due to image transformations, transcoding . . . . A CRC can be advantageously inserted using less bits than the number of bits required to insert the coded data to be substituted.

Figure 4:
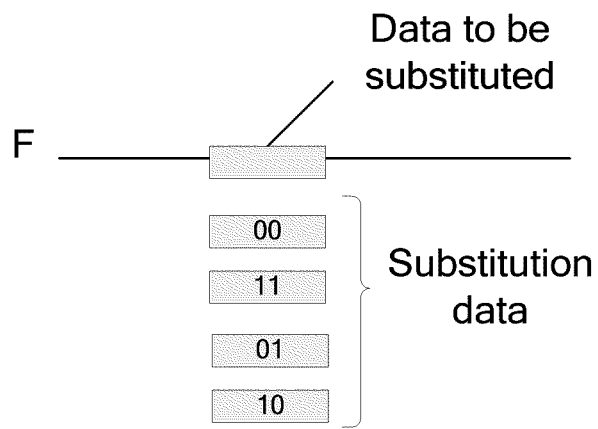

According to another variant illustrated on FIG. 4, more than two substitution data can be inserted at step 12. Each substitution data represents a data to embed. In this case, more than one bit may be embedded at a time. As an example illustrated on FIG. 4, four substitution data are inserted at step 12. One of the substitution data is used to embed '00' in the bitstream of coded data, a second of the substitution data is used to embed a '11' in the bitstream of coded data, a second of the substitution data is used to embed a '01' in the bitstream of coded data, and the fourth of the substitution data is used to embed a '10' in the bitstream of coded data. This variant may be used in combination with check data.

A second exemplary embodiment is described in relation with FIG. 1 within the framework of the H.264/MPEG4 AVC coding standard using SEI messages (SEI stands for "Supplemental Enhancement Information"). Such SEI message is defined in Annex D of the document ISO/IEC 14496 entitled <<Information technology—Coding of audio-visual objects—Part 10: Advanced Video Coding>> and published on Dec. 15, 2005). SEI messages defined in H.264 are not at all limited to this standard. Such messages may be used with future standards. They are also used with former standards such as H.263. H.263 is defined in document Supplemental Enhancement Information (SEI) of H.263 (defined in Annexes L and W of the recommendation from ITU-T entitled "SERIES H: AUDIOVISUAL AND MULTIMEDIA SYSTEMS—Infrastructure of audiovisual services—Coding of moving Video—Video coding for low bit rate communication") contains a number of features that can enhance the utility of decoded image data without requiring alteration of the decoding process.

A standard defines a syntax that any stream of coded data must comply with to be compatible with this standard. The syntax defines in particular how the various items of information are coded (for example the data relating to the images included in the sequence, the motion vectors, etc). According to H.264, the items are entropy coded using CABAC (English acronym of "Context-based Adaptive Binary Arithmetic Coding"). Note that if the decoding device does not possess the functionalities necessary for its use, this SEI is ignored. Advantageously, this second exemplary embodiment makes it possible to transmit watermark assistance data without modifying the standard.

At step 12, at least one identification data and at least one substitution data are inserted the bitstream of coded data F using a SEI message.

At step 14, a format data is inserted in the bitstream of coded data F using the SEI message.

To this aim, a new SEI message named WSM SEI message that encapsulate the watermark assistance data is defined. The new syntax is exhibited below in an array in the form of a pseudo-code with the same conventions as in the document ISO/IEC 14496-10. In particular, the operator '==' signifies "equal to" and '!=' means "not equal to". The operator '!' is the "NOT" logical operator. The SEI message uses the "data unregistered" SEI payload type (SEI_payloadType equals to 5) and is defined as follows with reference to section 7.3.2.3.1 of ISO/IEC 14496-10:

| WSM_sei_message( ) { | Descriptor |
|---|---|
| user_data_unregistered_payload_type_byte /* equal to 0x05 */ SEI_PayLoadSize = 0 while( next_bits( 8 ) = = 0xFF ) { | u(8) |
| ff_byte /* equal to 0xFF */ SEI_PayLoadSize += 255 } | f(8) |
| last_payload_size_byte SEI_PayLoadSize += last_payload_size_byte | u(8) |
| WSM_user_data_unregistered (SEI_PayLoadSize) } | b(v) | where:

f(n) is a fixed-pattern bit string using n bits written (from left to right) with the left bit first;

u(n) is an unsigned integer using n bits;

b(8) is a byte having any pattern of bit string (8 bits);

b(v) is a variable length bit field and next_bits(n) provides the next bits in the bitstream of coded data for comparison purposes, without advancing the bitstream pointer. It therefore provides a look at the next n bits in the bitstream of coded data with n being its argument.

ff_byte is a byte equal to 0xFF identifying a need for a longer representation of the syntax structure that it is used within.

user_data_unregistered_payload_type_byte is the payload type of the WSM SEI message. As an example, for MPEG-4 AVC user_data_unregistered_payload_type_byte equals 0x05.

last_payload_size_byte is the last byte of the size of the SEI message. Such type of SEI message are further defined in the section 7.3.2.3.1 of the document ISO/IEC 14496-10.

The WSM_user_data_unregistered( ) is defined as follows:

| WSM_user_data_unregistered( SEI_PayLoadSize ) { | Descriptor |
|---|---|
| uuid_iso_iec_11578 | u(128) |
| WSM_Payload (SEI_PayLoadSize − 16) } | u(v) | uuid_iso_iec_11578 shall have a value specified as a UUID (UUID stands for Universal Unique IDentifier) according to the procedures defined in the document ISO/IEC11578:1996 Annex A. An example of such UUID generated using the IETF RFC 4122 is 1dfa52e0-ef8b-11dd-ba2f-0800200c9a66.

The syntax of the WSM_payload containing the information relating to the watermark assistance data is defined in the following manner:

| WSM_Payload (WSM_PayLoadSize) { | Descriptor |
|---|---|
| WSM_FormatType | u(8) |
| WSM_NumberOfEntries | u(4) |
| WSM_SequenceTag | u(12) |
| PayLoadIndex = 2 | |
| if (WSM_FormatType = = FT0) { | |
|   Skip( ) | |
| } | |
| else if (WSM_FormatType = = FT1) { | |
|   for (i = 0 ; i ≦ WSM_NumberOfEntries ; i++) { | |
|     WSM_StringLength [i] | u(4) |
|     WSM_StringOffset [i] | u(20) |
|     PayLoadIndex += (20+4)/8 | |
|     for (j = 0 ; j ≦ WSM_StringLength[i] ; j++) { | |
|       WSM_CurrentValue [i][j] | u(8) |
|     } | |
|     for (j = 0 ; j ≦ WSM_StringLength[i] ; j++) { | |
|       WSM_OtherValue [i][j] | u(8) |
|     } | |
|     PayLoadIndex += 2 * (WSM_StringLength[i] + 1) | |
|   } | |
| } | |
| else if (WSM_FormatType = = FT2) { | |
|   for (i = 0 ; i ≦ WSM_NumberOfEntries ; i++) { | |
|     WSM_StringLength [i] | u(4) |
|     WSM_StringOffset [i] | u(20) |
|     PayLoadIndex += (20+4)/8 | |
|     for (j = 0 ; j ≦ WSM_StringLength[i] ; j++) { | |
|       WSM_CurrentValue [i][j] | u(8) |
|     } | |
|     for (j = 0 ; j ≦ WSM_StringLength[i] ; j++) { | |
|       WSM_OneValue [i][j] | u(8) |
|     } | |
|     for (j = 0 ; j ≦ WSM_StringLength[i] ; j++) { | |
|       WSM_ZeroValue [i][j] | u(8) |
|     } | |
|     PayLoadIndex += 3 * (WSM_StringLength[i] + 1) | |
|   } | |
| } | |
| else if (WSM_FormatType = = FT3) { | |
|   for (i = 0 ; i ≦ WSM_NumberOfEntries ; i++) { | |
|     WSM_StringLength [i] | u(4) |
|     WSM_StringOffset [i] | u(20) |
|     WSM_CurrentValueCRC [i] | u(8) |
|     PayLoadIndex += (20+4)/8 + 1 | |
|     for (j = 0 ; j ≦ WSM_StringLength[i] ; j++) { | |
|       WSM_OtherValue [i][j] | u(8) |
|     } | |
|     PayLoadIndex += (WSM_StringLength[i] +1 ) | |
|   } | |
| } | |
| else if (WSM_FormatType = = FT4) { | |
|   for (i = 0 ; i ≦ WSM_NumberOfEntries ; i++) { | |
|     WSM_StringLength [i] | u(4) |
|     WSM_StringOffset [i] | u(20) |
|     WSM_CurrentValueCRC [i] | u(8) |
|     PayLoadIndex += (20+4)/8 + 1 | |
|     for (j = 0 ; j ≦ WSM_StringLength[i] ; j++) { | |
|       WSM_OneValue [i][j] | u(8) |
|     } | |
|     for (j = 0 ; j ≦ WSM_StringLength[i] ; j++) { | |
|       WSM_ZeroValue [i][j] | u(8) |
|     } | |
|     PayLoadIndex += 2 * (WSM_StringLength[i] +1 ) | |
|   } | |
| } | |
| else if (WSM_FormatType = = FT5) { | |
|   for (i = 0 ; i ≦ WSM_NumberOfEntries ; i++) { | |
|     WSM_StringLength [i] | u(4) |
|     WSM_PacketOffset [i] | u(12) |

-continued

```
WSM_Payload (WSM_PayLoadSize) {                              Descriptor
        WSM_StringRelativeOffset [i]                         u(8)
        PayLoadIndex += (20+4)/8
        for (j = 0 ; j ≦ WSM_StringLength[i] ; j++) {
            WSM_CurrentValue [i][j]                          u(8)
        }
        for (j = 0 ; j ≦ WSM_StringLength[i] ; j++) {
            WSM_OtherValue [i][j]                            u(8)
        }
        PayLoadIndex += 2 *
            (WSM_StringLength[i] + 1)
    }
}
else if (WSM_FormatType = = FT6) {
    for (i = 0 ; i ≦ WSM_NumberOfEntries ; i++) {
        WSM_StringLength [i]                                 u(4)
        WSM_PacketOffset [i]                                 u(12)
        WSM_StringRelativeOffset [i]                         u(8)
        PayLoadIndex += (20+4)/8
        for (j = 0 ; j ≦ WSM_StringLength[i] ; j++) {
            WSM_CurrentValue [i][j]                          u(8)
        }
        for (j = 0 ; j ≦ WSM_StringLength[i] ; j++) {
            WSM_OneValue [i][j]                              u(8)
        }
        for (j = 0 ; j ≦ WSM_StringLength[i] ; j++) {
            WSM_ZeroValue [i][j]                             u(8)
        }
        PayLoadIndex += 3 *
            (WSM_StringLength[i] + 1)
    }
}
else if (WSM_FormatType = = FT7) {
    for (i = 0 ; i ≦ WSM_NumberOfEntries ; i++) {
        WSM_StringLength [i]                                 u(4)
        WSM_PacketOffset [i]                                 u(12)
        WSM_StringRelativeOffset [i]                         u(8)
        WSM_CurrentValueCRC [i]                              u(8)
        PayLoadIndex += (20+4)/8 + 1
        for (j = 0 ; j ≦ WSM_StringLength[i] ; j++) {
            WSM_OtherValue [i][j]                            u(8)
        }
        PayLoadIndex +=
            (WSM_StringLength[i] + 1 )
    }
}
else if (WSM_FormatType = = FT8) {
    for (i = 0 ; i ≦ WSM_NumberOfEntries ; i++) {
        WSM_StringLength [i]                                 u(4)
        WSM_PacketOffset [i]                                 u(12)
        WSM_StringRelativeOffset [i]                         u(8)
        WSM_CurrentValueCRC [i]                              u(8)
        PayLoadIndex += (20+4)/8 + 1
        for (j = 0 ; j ≦ WSM_StringLength[i] ; j++) {
            WSM_OneValue [i][j]                              u(8)
        }
        for (j = 0 ; j ≦ WSM_StringLength[i] ; j++) {
            WSM_ZeroValue [i][j]                             u(8)
        }
        PayLoadIndex += 2 *
            (WSM_StringLength[i] +1 )
    }
}
else {
    Unsupported ( )
}
for (i = PayLoadIndex ; i < WSM_PayLoadSize ; i++) {
    WSM_Filler [i]                                           u(8)
}
}
```

A string or CABAC string is defined as a succession of bits. Therefore, in the following, the word 'string' refers to a piece of consecutive bits in the bitstream of coded data that will be substituted.

WSM_FormatType is a byte used to define the way the substitution will be performed and therefore the formatting of the watermark assistance data entries. The following formatting is defined as an example:

FT0: the entries are blank and no error may be reported.

FT1: Only one substitution value WSM_OtherValue is proposed to embed a "1", while the current value WSM_CurrentValue is used to embed a "0". The current value WSM_CurrentValue is the CABAC encoded bytes that may have to be substituted. The current value (WSM_CurrentValue) is also transmitted as a check data to help increase the robustness of the personalization process.

FT2: Two substitution values are proposed, WSM_ZeroValue will embed a "0" while WSM_OneValue will embed a "1". The current value (WSM_CurrentValue) is also transmitted as a check data to help increase the robustness of the personalization process.

FT3: Same as FT1, with the WSM_CurrentValue string replaced by a simple 1-byte CRC to save bit-rate. This WSM_CurrentValueCRC will be used as a check data in the consumer device to make the personalization process more robust.

FT4: Same as FT2, with the WSM_CurrentValue string replaced by a simple 1-byte CRC to save bit-rate. This WSM_CurrentValueCRC will be used in the consumer device as a check data to make the personalization process more robust.

FT5: Same as FT1, but with WSM_StringOffset split into 2 subfields: a packet address (WSM_PacketOffset) and a byte address inside the pointed packet (WSM_StringRelativeOffset).

FT6: Same as FT2, but with WSM_StringOffset split into 2 subfields: a packet address (WSM_PacketOffset) and a byte address inside the pointed packet (WSM_StringRelativeOffset).

FT7: Same as FT3, but with WSM_StringOffset split into 2 subfields: a packet address (WSM_PacketOffset) and a byte address inside the pointed packet (WSM_StringRelativeOffset).

FT8: Same as FT4, but with WSM_StringOffset split into 2 subfields: a packet address (WSM_PacketOffset) and a byte address inside the pointed packet (WSM_StringRelativeOffset).

Other: reserved for future use. An error will be reported.

As an example, FT0=0x00, FT1=0x01, FT2=0x02, FT3=0x03, FT4=0x04, FT5=0x05, FT6=0x06, FT7=0x07, and FT8=0x08. Of course, other values may be used.

In the case of format, FT1 to FT8, check data are also encoded in the stream at step 12 in order to make the personalization process more robust. In the consumer device, before substituting the CABAC string of bytes that are pointed by WSM_StringOffset, this CABAC string is compared with the WSM_CurrentValue. In case they do not match the substitution does not occur and an error is possibly reported. According to a variant a CRC is computed locally from the CABAC string of bytes that are pointed by WSM_StringOffset and is compared to WSM_CurrentValueCRC. In case they do not match the substitution does not occur and an error is possibly reported. More WSM_FormatType could be introduced to enable more bits (e.g. 8 instead of 4) to code the WSM_NumberOfEntries and to enable a 24 bits address for WSM_StringLength (or 16 bits for WSM_PacketOffset).

As a first example, a new format type WSM_FormatType==FT9 equivalent to FT2 is defined (i.e. two substitution values in addition to the WSM_CurrentValue). FT9 format type is different from FT2 in that WSM_NumberOfEntries is coded on 8 bits (instead of 4) and in that WSM_StringLength is coded on 24 bits (instead of 4). This makes it possible to handle larger access units. Such a format is well suited for high bite rate coding.

As a second example, another format FTn is defined, with n a positive integer different from those already used. According to this format, all substitution entries have the same string length. Therefore, in order to minimize the watermark assistance data payload size, the WSM_StringLength[i] is made common to all entries and thus removed from the loop "for (i=0; i≦WSM_NumberOfEntries; i++)" and moved to the WSM_PayLoad header (e.g. just after the WSM_SequenceTag). The WSM_StringthLength[i] is thus changed into a global WSM_StringLength.

WSM_NumberOfEntries specifies the number of entries minus one that are present in the current watermark assistance data. Substitutions are then detailed per entry.

According to a variant WSM_NumberOfEntries specifies the number of entries.

WSM_SequenceTag indicates which bit (i.e. the first bit, the second bit, the third bit, etc) of the digital code payload shall be inserted in the first entry of the watermark assistance data. The payload comprises a "user ID" and may further comprise a "Time Stamp", other information (e.g. copyright), bits of protection, redundancy.

WSM_StringLength defines the length minus one (e.g. in number of bytes) of the substitution string.

According to a variant WSM_StringLength defines the length of the substitution string.

WSM_StringOffset is the absolute address in bytes of the first byte to be substituted in the current access unit. If WSM_StringOffset equals 0, it identifies the first bytes of the $1^{st}$ slice of the current access unit. An access unit is defined as "a set of NAL units always containing exactly one primary coded picture". A NAL unit is "a syntax structure containing an indication of the type of data to follow and bytes containing that data". Access unit and NAL unit are part of the MPEG-4 AVC/H.264 standard.

According to a specific characteristic the entries are organized by offset ascending order.

According to a variant, WSM_StringOffset is split into 2 subfields, the first one WSM_PacketOffset being the TS packet address and the second one WSM_StringRelativeOffset an offset value in bytes from the beginning of the TS packet. This may ease the processing in the consumer device. In this case, the following fields are encoded:

If WSM_PacketOffset equals 0, it identifies the TS packet that comprises the first byte of the WSM_PayLoad.

WSM_StringRelativeOffset is the relative address of the $1^{st}$ byte to be substituted in the TS packet pointed by WSM_PacketOffset. If WSM_StringRelativeOffset equals 0, it identifies the first byte of the TS packet payload.

WSM_Filler are filler bytes. As an example, WSM_Filler[i] equals 0xFF. WSM_Filler can be used for stuffing, if WSM_PayLoadSize is too large. In H.264, such private SEI messages are embedded in the bitstream of coded data using NAL units (English acronym for "Network Adaptation Layer") that provide an accurate time reference to images, therefore facilitating the synchronization between watermark assistance data and the image coded data. Indeed, SEI messages are "attached" to an access unit. Depending on the MPEG4/AVC coding mode (Field, Frame, MBAFF) an access unit contains one full field or one full frame. The WSM SEI message is therefore encapsulated in a NAL unit as follows:

| nal_unit { | | Descriptor |
|---|---|---|
| forbidden_zero_bit | /* shall be 0 */ | f(1) |
| nal_ref_idc | /* shall be 0 for a SEI message */ | u(2) |
| nal_unit_type | /* equal to 0x06 for a SEI message */ | u(5) |
| Other SEI messages( ) | /* Optional */ | b(v) |
| WSM_sei_message( ) | | b(v) |
| Other SEI messages( ) | /* Optional */ | b(v) |
| rbsp_trailing_bits( ) | | |
| } | | | forbidden_zero_bit shall be equal to 0 according to H.264.

nal_ref_idc shall be equal to 0 for all NAL units having nal_unit_type equal to 6, 9, 10, 11, or 12 according to H.264.

nal_unit_type specifies the type of RBSP (stands for "Raw Byte Sequence Payload") data structure contained in the NAL unit as specified in Table 7-1 of ISO/IEC 14496-10. VCL NAL units (VCL is the English acronym of "Video Coding Layer") are specified as those NAL units having nal_unit_type equal to 1 to 5, inclusive. All remaining NAL units are called non-VCL NAL units. Nal_unit_type equal to 6 means SEI message.

rbsp_trailing_bits( ) is a bit string of a specific variable length code. In practice, it generally returns the sequence 0x80 followed by 0x00.

A third exemplary embodiment is proposed within the framework of the H.264/MPEG4 AVC coding standard using SEI messages. According to this third exemplary embodiment, a new type of information SEI is defined so as to code the additional information relating to the WSM. For this purpose, a new value for the field payloadType is defined from among the values not yet used (for example payloadType equal to 22). Specifically, the first 22 values of payloadType (from 0 to 21) are already used to code particular information such as for example the characteristics of the grain of the film which correspond to a payloadType equal to 19. The new syntax is exhibited below in an array in the form of a pseudo-code with the same conventions as in the document ISO/IEC 14496-10. The syntax of the SEI data (i.e. sei_payload) is extended in the following manner with the WSM_payload being identical to the WSM_payload of the second embodiment:

| sei_payload( payloadType, payloadSize ) { | C | Descriptor |
|---|---|---|
| if( payloadType = = 0 ) | | |
|   buffering_period( payloadSize ) | 5 | |
| ..... | | |
| else if( payloadType = = 21 ) | | |
|   stereo_video_info( payloadSize ) | 5 | |
| else if ( payloadType = = 22 ) | | |
|   WSM_payload(WSM_payloadSize ) | 5 | |
| Else | | |
|   reserved_sei_message( payloadSize ) | 5 | |
| if( !byte_aligned( ) ) { | | |
|   bit_equal_to_one /* equal to 1 */ | 5 | f(1) |
|   while( !byte_aligned( ) ) | | |
|     bit_equal_to_zero /* equal to 0 */ | 5 | f(1) |
| } | | |
| } | | | byte_aligned( ) is used to check whether if the bitstream of coded data is aligned on a byte boundary.

Figure 5:
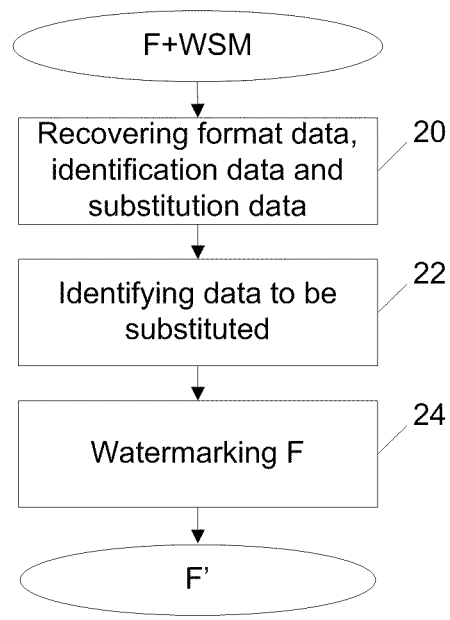
FIG. 5 is a block diagram of a watermarking method according to the invention.

The invention relates to a watermarking method described with reference to FIGS. 5 and 6. More precisely, it relates to a method of watermarking a bitstream F+WSM of coded data comprising format data, identification data and substitution data.

At a step 20, format data defining a manner of substituting coded data to be substituted by substitution data, identification data identifying coded data to be substituted and at least one substitution data for each coded data to be substituted are determined by decoding a part of the bitstream of coded data F. As an example, corresponding to second and third exemplary embodiments, SEI messages encapsulating the WSM are decoded.

At a step 22, coded data to be substituted are identified by the identification data.

At a step 24, the bitstream of coded data F is watermarked into a watermarked bitstream F' by substituting in it, each identified coded data to be substituted by the appropriate substitution data. The appropriate substitution data is determined according to the format data based on the substitution data and further based on the value of the watermark W to embed in the bitstream of coded data F.

Figure 6:
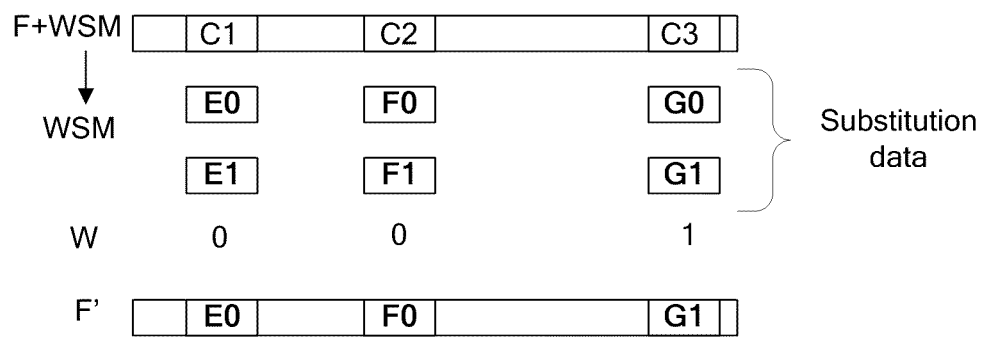
FIG. 6 illustrates a bitstream of coded data and its associated bitstream watermarked according to the watermarking method according to the invention.

As an example, on FIG. 6, three coded data C1, C2 and C3 to be substituted are identified at step 22 from the identification data recovered at step 20.

At step 24, each of these three coded data are substituted depending on the digital code W to embed. As an example, W equals 001. Therefore, in order to embed the bit 0 into C1, C1 is substituted by E0 while E1 is used to embed a bit 1. Then in order to embed the bit 0 into C2, C2 is substituted by F0 while F1 is used to embed a bit 1. Finally in order to embed the bit 1 into C3, C3 is substituted by G1 while G0 is used to embed a bit 0.

According to a variant, during the step 20, check data are also determined and the substitutions are made at step 24 only when the check data match the received data to be substituted.

The invention further relates to a bitstream F of coded data representative of a sequence of images, of audio data, of 3D data, or of any kind of digital content. The bitstream of coded data according to the invention comprises watermark assistance data and more particularly:
  identification data identifying coded data to be substituted;
  at least one substitution data for each coded data to be substituted; and
  a format data defining a manner of substituting the coded data to be substituted by the substitution data.

Figure 7:
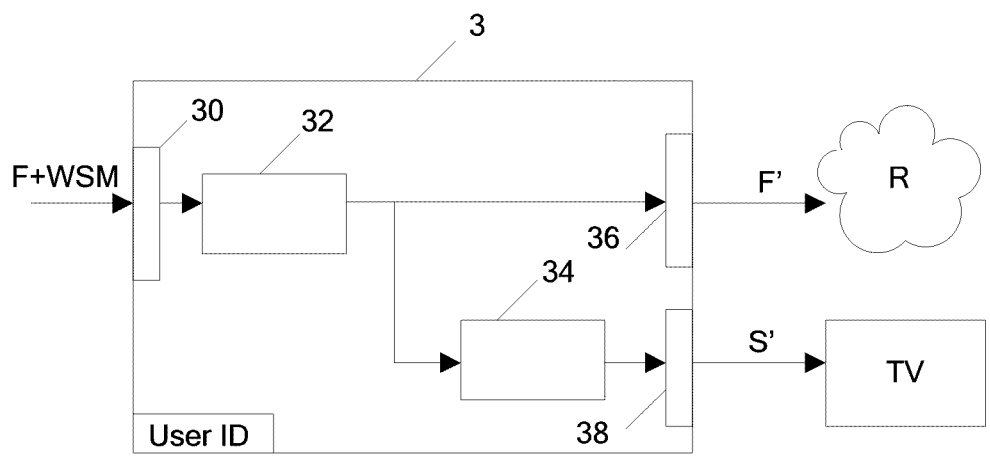
FIG. 7 represents a device according to the invention.

The invention further relates to a device 3 described with reference to FIG. 7. The device 3 comprises an entry 30 for receiving a bitstream F of coded data representative of a sequence of images or any digital content comprising watermark assistance data. The bitstream of coded data F is advantageously generated by the method of insertion according to one of the three exemplary embodiments. The output of the entry 30 is linked to the input of a watermarking module 32. The output of the watermarking module 32 is linked to a first output 36 of the device 3 and to the input of a decoding module 34. The output of the decoding module 34 is linked to a second output 38 of the device 3.

The watermarking module 32 is adapted to implement the steps 20, 22 and 24 of the watermarking method according to the invention. To this aim, the watermarking module 32 comprises:
  a unit for determining, from the bitstream of coded data, identification data identifying coded data to be substituted, at least one substitution data for each coded data to be substituted and a format data defining a manner of substituting coded data to be substituted by the substitution data;
  a unit for identifying, with the identification data, coded data to be substituted; and
  a watermarking unit for watermarking the bitstream of coded data by substituting the image coded data to be substituted by one substitution coded data on the basis of the format data and of the watermarking data.

The watermark W to embed in F comprises at least a User ID/an identifier making it possible to identify the device 3. The first output 36 is outputting a watermarked bitstream F' which may be transmitted to a network R such as WLAN (English acronym of "Wireless Local Area Network"). The decoding module 34 is adapted to decode the watermarked stream F' in order to reconstruct a watermarked digital content S' such as a watermarked sequence of images. S' may be transmitted to a TV set for display.

According to an advantageous embodiment, the watermarking assistance data are ERASED in the bitstream of coded data after having been applied to avoid buffer copy and thus recovering of the watermarking assistance data by a pirate.

As an example linked to the second exemplary embodiment of the coding method, the following process may be applied to erase the watermarking assistance data:
  Set WSM_FormatType=0
  Set WSM_NumberOfEntries=0
  Fill in the rest of the payload with WSM_Filler.

SEI messages are embedded in the bitstream of coded data using NAL units (English acronym for "Network Adaptation Layer") that provide an accurate time reference to images, therefore facilitating the synchronization between watermark assistance data and the image coded data. Furthermore, the SEI messages are encrypted with the same encryption system than the compressed sequence of images and deeply merged with it. So, to remove the watermarking assistance data, it is required to break the encryption system. Finally, SEI messages are not limited in terms of payload.

Of course, the invention is not limited to the embodiments described above. More precisely, the invention is not limited to the insertion of data into a bitstream of image coded data. Indeed, the bitstream of coded data in which data are inserted may represents any kind of digital content such as for example audio or 3D data.

In addition, the invention is not at all limited to the MPEG-4 AVC video coding standard.

What is claimed is:

1. A method for inserting watermark assistance data in a bitstream of coded data representing a digital content comprising inserting in said bitstream of coded data a supplemental enhancement information message, wherein said supplemental enhancement information comprises
  at least one of identification data identifying coded data to be substituted,
  a format data defining
    a number of substitution data,
    a method of substituting the coded data to be substituted by the substitution data, said method being one selected from a plurality of different available methods of substituting the coded data for the substitution data, and
    if substitution of said coded data is made subject to error check;
  at least one substitution data depending on the format data for each coded data to be substituted and
  if said format data defines that substitution is made subject to error check, at least one check data to check if the coded data to be substituted undergone some modification during transmission, said checking being processed by comparing the transmitted coded data to be substituted with said check data, substitution being made only if the transmitted coded data match said check data.

2. The method of insertion according to claim 1, wherein said check data is a cyclic redundancy check computed from the coded data to be substituted.

3. The method of insertion according to claim 1, wherein said check data is the coded data to be substituted.

4. The method of insertion according to claim 1, wherein said supplemental enhancement information message comprises a first identification data comprising an absolute address identifying the beginning of the coded data to be substituted and a second identification data comprising a length of said substitution data.

5. The method of insertion according to claim 1, wherein said bitstream of coded data being encapsulated in transport packets, said supplemental enhancement information message comprises a first identification data comprising a data identifying the transport packet comprising the coded data to be substituted, a second identification data comprising an offset value relative to the beginning of said transport packet identifying the beginning of the coded data to be substituted and a third identification data comprising a length of said substitution data.

6. A device comprising:
- an input for receiving a bitstream of coded data representative of a digital content;
- a watermarking module for watermarking said bitstream of coded data on the basis of an identifier associated to said device into a watermarked bitstream;
- a first output for transmitting said watermarked bitstream; and wherein the watermarking module comprises:
- a unit for inserting in said bitstream of coded data, a supplemental enhancement information message comprising at least one identification data identifying coded data to be substituted,
- a format data defining
  - a number of substitution data,
  - a method of substituting the coded data to be substituted by the substitution data, said method being one selected from a plurality of different available methods for substituting the coded data with the substitution data, and
  - if substitution of said coded data is made subject to error check and,
- at least one substitution data depending on the format data for each coded data to be substituted, and,
- if said format data defines that substitution is made subject to error check, at least one check data to check if the coded data to be substituted undergone some modification during transmission, said checking being processed by comparing the transmitted coded data to be substituted with said check data, substitution being made only if the transmitted coded data matches said check data;
- a unit for identifying with said identification data coded data to be substituted; and
- a watermarking unit for watermarking said bitstream of coded data by substituting the coded data to be substituted by said at least one substitution data when the check data match the coded data to be substituted.

7. The device according to claim 6 further comprising:
- a decoding module for reconstructing a watermarked digital content from said watermarked bitstream; and
- a second output for transmitting said watermarked digital content.

* * * * *